(12) United States Patent
Myrah et al.

(10) Patent No.: US 9,037,910 B2
(45) Date of Patent: May 19, 2015

(54) SAS SELF-TEST OPERATIONS

(75) Inventors: Michael G. Myrah, Cypress, TX (US); Balaji Natrajan, Spring, TX (US); Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

(21) Appl. No.: 13/561,989

(22) Filed: Jul. 30, 2012

(65) Prior Publication Data

US 2014/0032967 A1    Jan. 30, 2014

(51) Int. Cl.
*G06F 11/00*    (2006.01)
*G06F 11/22*    (2006.01)

(52) U.S. Cl.
CPC .................................. *G06F 11/221* (2013.01)

(58) Field of Classification Search
CPC combination set(s) only.
See application file for complete search history.

(56) References Cited

U.S. PATENT DOCUMENTS

| | | | |
|---|---|---|---|
| 7,203,872 B2 * | 4/2007 | Frodsham et al. | 714/716 |
| 7,536,584 B2 | 5/2009 | Davies et al. | |
| 7,890,794 B1 * | 2/2011 | Gasser | 714/5.1 |
| 7,912,995 B1 * | 3/2011 | Long et al. | 710/18 |
| 2006/0061369 A1 * | 3/2006 | Marks et al. | 324/542 |
| 2007/0011373 A1 * | 1/2007 | Marks et al. | 710/104 |
| 2007/0061632 A1 * | 3/2007 | Uddenberg et al. | 714/44 |
| 2007/0061681 A1 * | 3/2007 | Carmichael | 714/760 |
| 2007/0070885 A1 * | 3/2007 | Uddenberg et al. | 370/225 |
| 2007/0087615 A1 * | 4/2007 | Paulsen et al. | 439/378 |

* cited by examiner

*Primary Examiner* — Amine Riad
(74) *Attorney, Agent, or Firm* — Conley Rose, P.C.

(57) ABSTRACT

A self-test engine to manage self-test mode operations between adjacent PHYs of a serial-attached SCSI (SAS) topology.

16 Claims, 6 Drawing Sheets

SAS SELF-TEST OPERATIONS

BACKGROUND

Storage access systems require a communication fabric and protocol between the devices that initiate a storage access request (e.g., to read/write data) and the targeted storage device. As an example, the original Small Computer System Interface (SCSI) standard was developed in 1981 to provide a common interface that could be used across all peripheral platforms and system applications, such as Redundant Array of Independent Disks (RAID) storage. Since that time, there have been numerous generations of the parallel SCSI protocol. Each generation doubled the bandwidth of the previous one, primarily by doubling the bus clock frequency. But as the bus frequency was increased with each new generation, so did the negative impact of bus contention, signal degradation, and signal skew—slight signal delays from one wire trace to the next. After the development of Ultra320 SCSI with a bandwidth of 320 MB/s per channel, further bandwidth improvements to parallel SCSI could not occur without developing new and expensive technologies.

In 2001, the Serial Attached SCSI Working Group was founded to define the rules for exchanging information between SCSI devices using a serial attached SCSI (SAS) interconnect. SAS was later transferred to the InterNational Committee for Information Technology Standards (INCITS) T10 to become an American (ANSI) and international (ISO/IEC) standard. SAS inherits its command set from parallel SCSI, frame formats and full duplex communication from Fibre Channel, and it uses the SATA interface for compatibility and investment protection. The SAS architecture solves the parallel SCSI problems of bus contention, clock skew, and signal degradation at higher signaling rates, thereby providing performance headroom to meet enterprise storage needs for years to come. In an SAS topology, the number of devices (initiators, targets, and expanders) allowed in a given domain is limited only by the size of the expander routing tables. In a SAS fabric, faulty PHYs periodically manifest themselves.

BRIEF DESCRIPTION OF THE DRAWINGS

For a detailed description of exemplary examples of the disclosure, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to methods and systems for self-test operations for serial attached SCSI (SAS) topology components. The disclosed self-test operations may be performed self-test engine implemented by, for example, initiator device PHYs, expander PHYs, and target device PHYs. In some examples, the disclosed self-test engine may be built into initiator device PHYs, expander PHYs, and/or target device PHYs of a SAS or SAS-2 topology. Initiators as described herein may correspond to array controllers. Targets as described herein may correspond to hard drives or solid-state drives or other end devices. The self-test engine operations may be triggered, for example, after deployment or after a problem arises in the SAS or SAS-2 topology.

It should be noted that the examples given herein should not be interpreted, or otherwise used, as limiting the scope of the disclosure, including the claims. In addition, one skilled in the art will understand that the following description has broad application, and the discussion of any particular example is not intended to intimate that the scope of the disclosure, including the claims, is limited to that example.

The disclosed self-test engine enables SAS topology components to better self-diagnose and correct/report hardware level physical layer issues. The disclosed self-test engine avoids command-line interface operations. Instead, a local PHY can remotely initiate self-testing on a remote PHY and thus self-testing can be triggered automatically by expanders or other SAS topology components in the field when PHYs are linked up. Additionally or alternatively, the self-testing can be triggered periodically after PHYs are linked up, thus providing a preventive approach to faulty hardware detection. Additionally or alternatively, the self-testing can be triggered in response to fault detection (e.g., dropped packets). The fault detection can be based on a predetermined fault threshold to avoid false faults.

Figure 1:
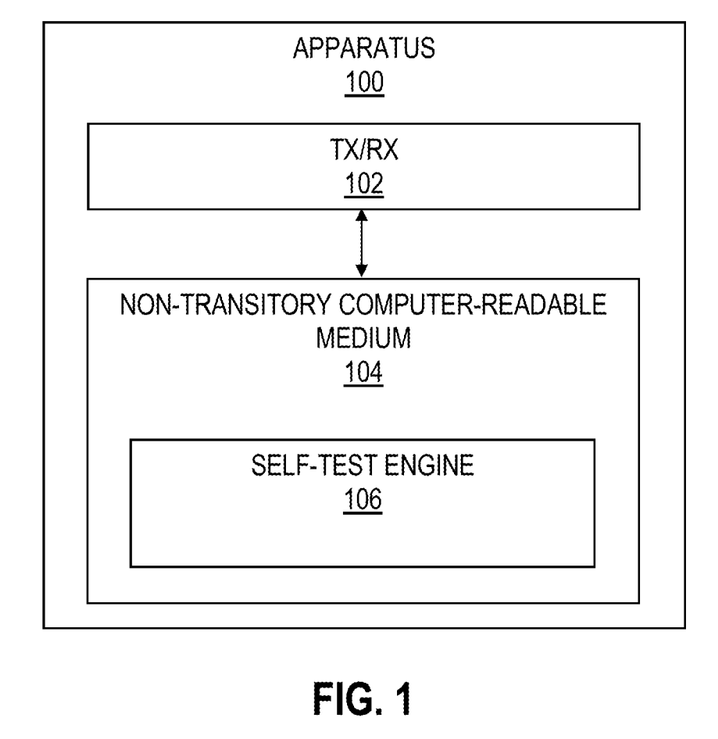
FIG. 1 shows an apparatus in accordance with an example of the disclosure.

FIG. 1 shows an apparatus 100 in accordance with an example of the disclosure. The apparatus 100 may correspond to an initiator device, an expander, or a target device of a SAS topology. As shown, the apparatus 100 comprises a transceiver 102 in communication with a non-transitory computer-readable medium 104 in communication with the transceiver 102 and storing a self-test engine 106 to manage self-test mode operations between adjacent PHYs of a serial-attached SCSI (SAS) topology. The self-test mode operations may be described herein as local PHY self-test mode operations and remote PHY self-test mode operations. In accordance with examples, any PHY with the self-test engine 106 may perform either local PHY self-test mode operations or remote PHY self-test mode operations.

As an example, remote PHY self-test mode operations may cause the transceiver 102 to receive a test-mode request primitive and send a test-mode acknowledge primitive. Further, remote PHY self-test mode operations may cause the transceiver 102 to send and receive DWORD patterns in accordance with a test-mode request. Further, remote PHY self-test mode operations may cause the transceiver 102 to receive a test-mode complete primitive and send a test-mode success result or test-mode failure result.

As an example, local PHY self-test mode operations may cause the transceiver 102 to send a test-mode request primitive and initiate transmission of DWORD patterns in response to a test-mode acknowledge primitive. Further, local PHY self-test mode operations may cause the transceiver 102 to send a test-mode complete primitive and receive a test-mode result. Further, local PHY self-test mode operations may cause the transceiver 102 to access counters to determine if invalid DWORDs were detected during the test-mode. Further, local PHY self-test mode operations may cause the transceiver 102 to update self-test report registers with the self-test results. The self-test report registers may be accessed by firmware or other mechanism to review test results.

Without limitation to other examples, two adjacent PHYs of a SAS topology may each employ the self-test engine 106 to perform the following illustrative procedure:
1. Two adjacent PHYs are linked together with each implementing the disclosed self-test engine;
2. A register may report the result of the most recent remote self-test operation;
3. A register may be used to initiate a remote self-test operation;
4. The remote self-test operation may be initiated by the local expander using either of the following two methods:
   a. By accessing an initiate remote self-test register;
   b. Initiating self-test operations at PHY link up time;
5. When the remote self-test operation is initiated from a PHY the following steps may occur;
   a. The local PHY may send a proprietary TEST MODE REQUEST SAS primitive to the remote PHY;
   b. The remote PHY may respond back with a proprietary TEST MODE ACK primitive or TEST MODE NACK (under certain error handling scenarios);
   c. After the TEST MODE ACK is received on the local PHY, both PHY's are in self-test mode and the following steps may occur:
      i. The local PHY may send a series of DWORD patterns (e.g., JPAT, D10.2, or RANDOM) to stress particular signal integrity parameters;
      ii. The remote PHY may echo the same DWORD pattern back to the local PHY thus testing both Rx and Tx sides of the local and remote PHYs;
   d. After the DWORD pattern sequence is complete, the local PHY may initiate a TEST MODE COMPLETE primitive to the remote PHY;
   e. If the remote PHY detected no invalid DWORDS during the test, a TEST MODE SUCCESS primitive may be generated;
   f. If the remote PHY detected invalid DWORDS, a TEST MODE FAILURE primitive may be generated;
   g. The local PHY may access local counters to determine if invalid DWORDs were detected while receiving them from the remote PHY;
   h. The local PHY may update registers for use by firmware with the test results and whether the test failed receiving data or transmitting data.

As used herein, a "SAS primitive" refers to a DWORD whose first character is K28.3 or K28.5 and whose remaining three characters are data characters with correct disparity. Once self-test operations are complete, higher level software can use the remote self-test operation results to take corrective SAS fabric action and report status to the user. The disclosed self-test engine allows storage solutions to detect, and then recover or report from hardware level issues that can potentially result in data loss. The self-test operations may be triggered at runtime either due to an event or poll.

Figure 2:
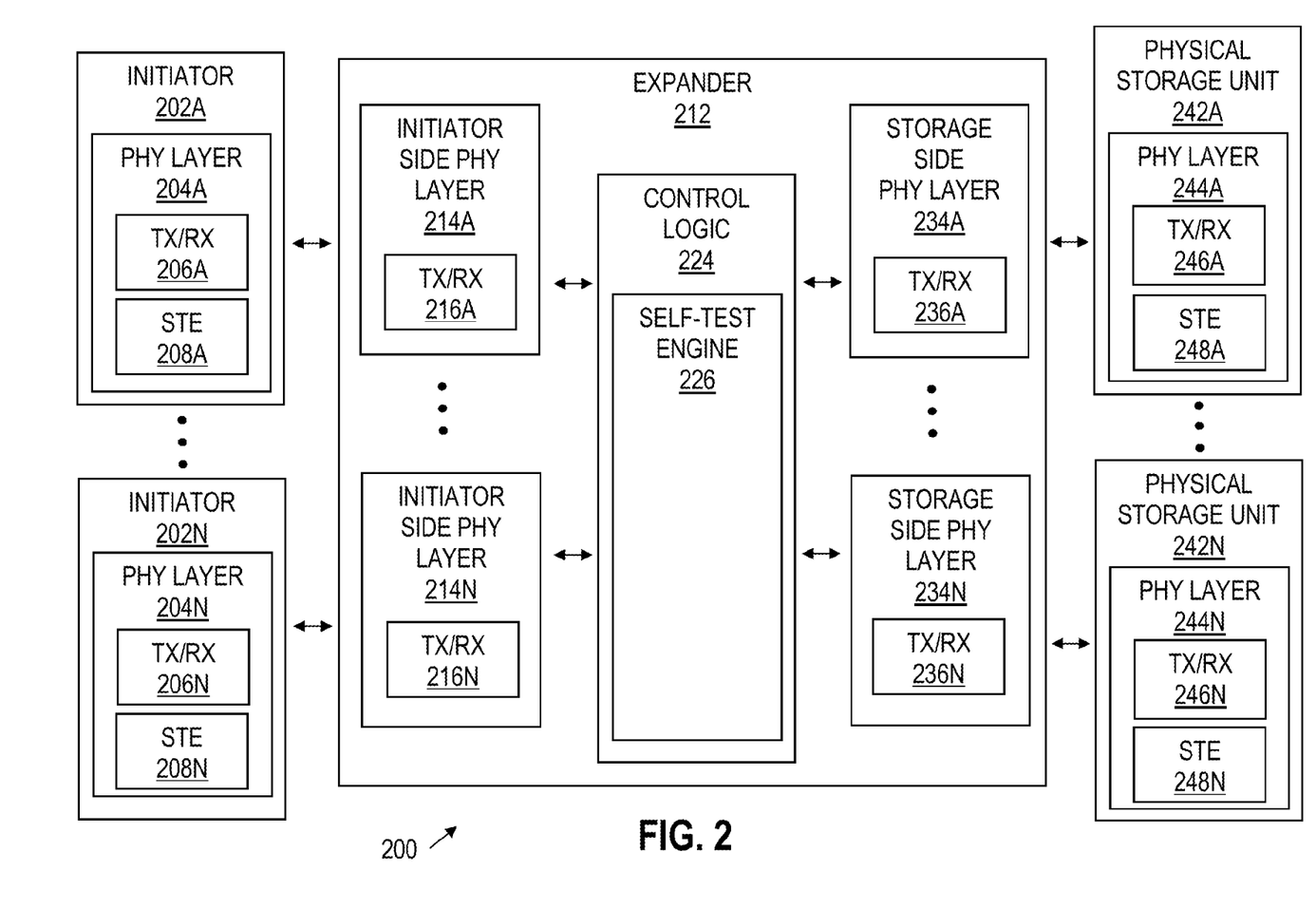
FIG. 2 shows a storage access system in accordance with an example of the disclosure.

FIG. 2 shows a storage access system 200 in accordance with an example of the disclosure. As shown, the storage access system 200 comprises a plurality of initiators 202A-202N in communication with a plurality of physical storage units 242A-242N via an expander 212. The initiators 202A-202N may correspond to memory controllers or another device that initiates a storage access request (e.g., to read or write data) directed to (targeting) at least one of the physical storage units 242A-242N. As shown, each of the initiators 202A-102N comprises a corresponding physical (PHY) layer 204A-204N with a transceiver (TX/RX) 206A-206N for transmitting storage access requests and receiving responses to storage access requests. Further, the PHY layers 204A-204N may comprise respective self-test engine (STEs) 208A-208N to perform the self-test operations described herein. Similarly, each of the physical storage units 242A-242N comprises a corresponding PHY layer 244A-244N with a transceiver (TX/RX) 246A-246N for receiving storage access requests and transmitting responses to storage access requests. Further, the PHY layers 244A-244N may comprise respective self-test engine (STEs) 248A-248N to perform the self-test mode operations described herein.

As shown, the expander 212 comprises initiator side PHY layers 214A-214N with corresponding transceivers 216A-216N and storage side PHY layers 234A-234N with corresponding transceivers 236A-236N. In accordance with at least some examples, the number of storage side PHY layers 234A-234N is greater than the number of initiator side PHY layers 214A-214N in order to increase flexibility regarding the number of physical storage units that are accessible by at least some of the initiators 202A-202N of the storage access system 200. In other words, the expander 212 operates to expand the number of physical storage units that are accessible to each initiator 202A-202N by supporting temporary connections between an initiator and a physical storage unit. In this manner, increased flexibility in the storage access system 200 is provided without increasing the complexity of the initiators 202A-202N nor the physical storage units 242A-242N. In at least some examples, the expander 212 comprises control logic 224 to manage the temporary connections between initiators 202A-202N and physical storage units 242A-242N.

To support self-test mode operations as described herein, the control logic 224 also may comprise a self-test engine 226. The self-test engine 226 enables any of the initiator side PHY layers 214A-214N and/or storage side PHY layers 234A-234N to perform the self-test mode operations described. In alternative examples, each of the initiator side PHY layers 214A-214N and each of the storage side PHY layers 234A-234N may comprise a self-test engine 226 to enable the self-test mode operations described.

Although the same variable "N" is used to describe the number of initiators, initiator side PHY layers, storage side PHY layers, and physical storage units, it should be understood that the variable "N" is intended to designate an arbitrary number. Thus, the number of initiators, the number of initiator side PHY layers, the number of storage side PHY layers, and the number of physical storage units could differ for different examples of the storage access system 200.

Figure 3:
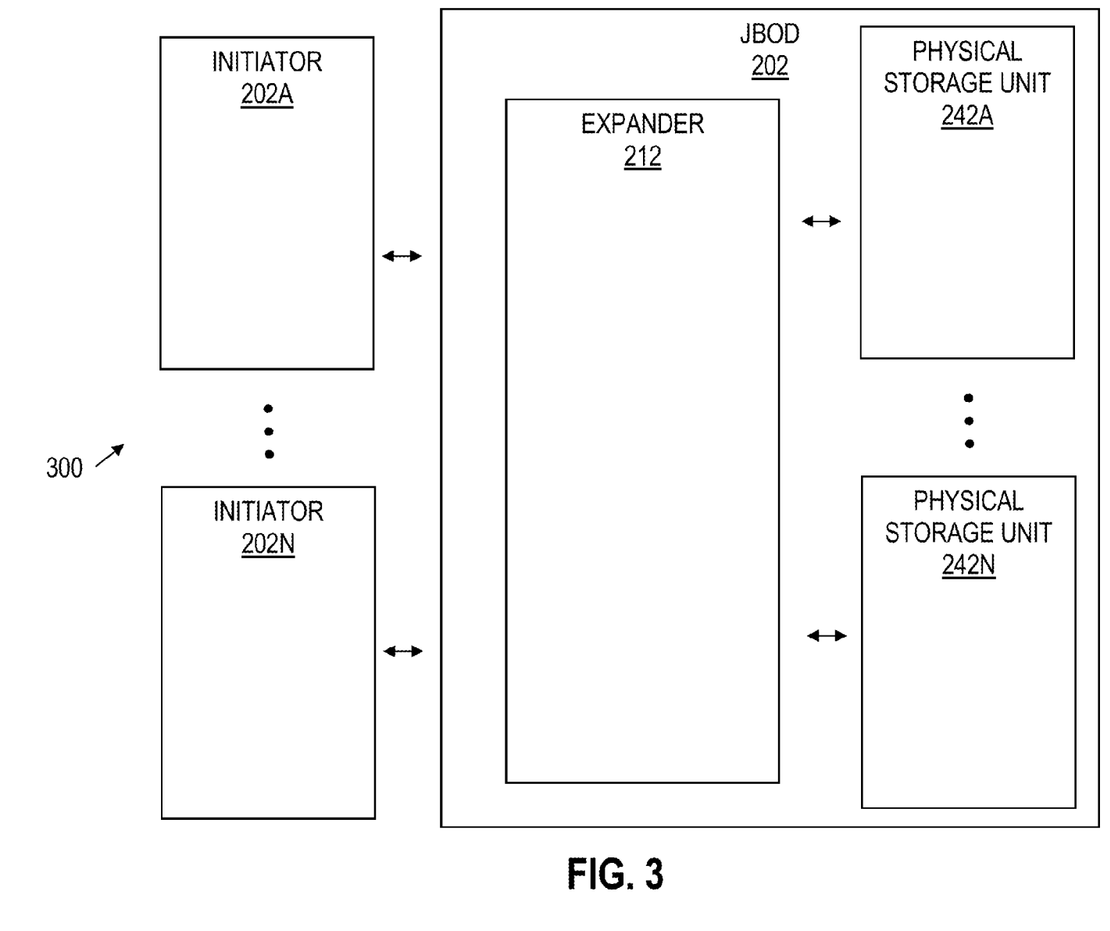
FIG. 3 shows another storage access system in accordance with an example of the disclosure.

FIG. 3 shows another storage access system 300 in accordance with an example of the disclosure. In the storage access system 300, the expander 212 and the physical storage units 242A-242N described for FIG. 2 are part of a just a bunch of drives (JBOD) unit 302. Using the self-test engines 208A-208N, 248A-248N, and/or 228, the components of the storage access system 300 are able to perform the self-test mode operations described herein.

Figure 4:
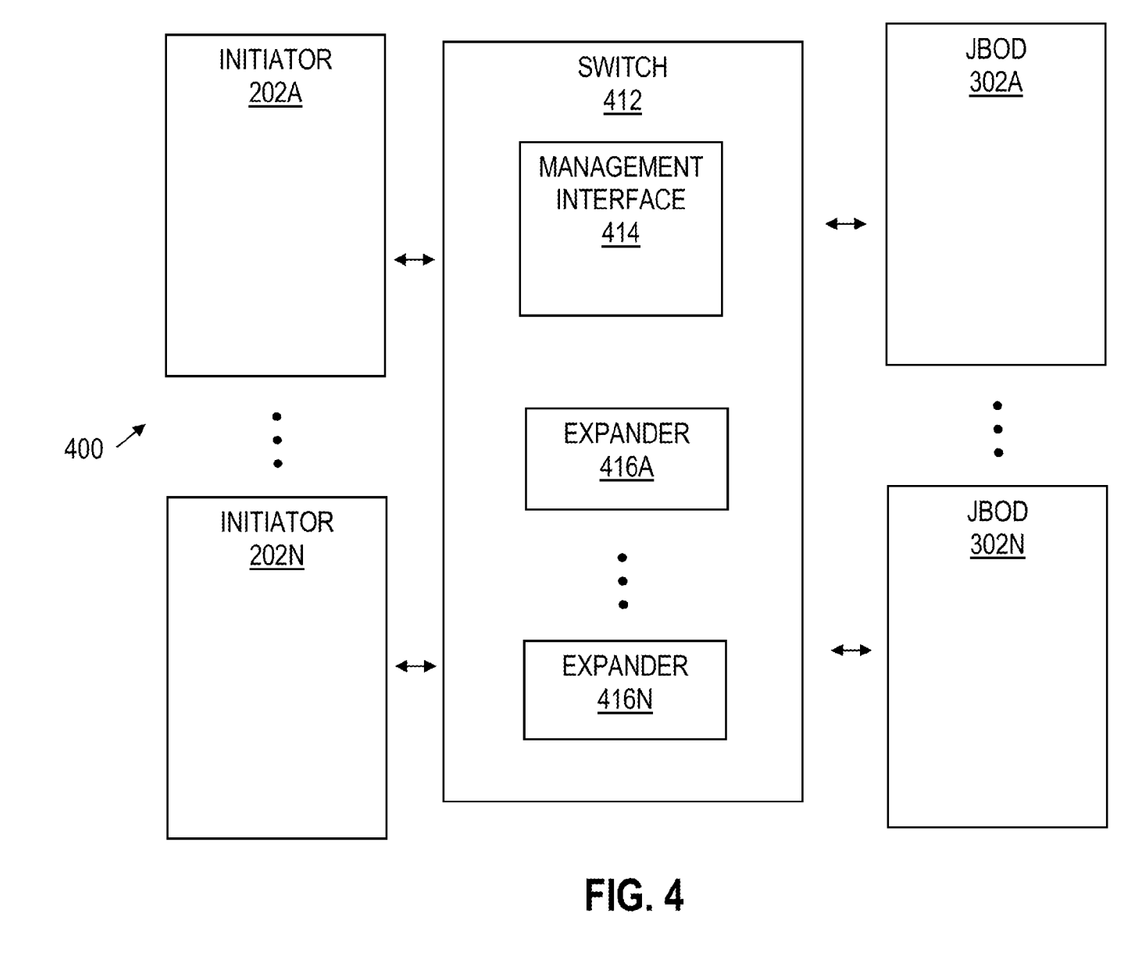
FIG. 4 shows yet another storage access system in accordance with an example of the disclosure.

FIG. 4 shows yet another storage access system 400 in accordance with an example of the disclosure. In the storage access system 400, a switch 412 having a plurality of expanders 416A-416N is positioned between initiators 202A-202N and a plurality of JBODs 302A-302N. The switch 412 also may comprise a management interface 414 to enable an administrator to program, manage, and/or update features of the switch 412. Each of the JBODs 302A-302N in the storage access system 300 may comprise a plurality of physical storage units as described for FIG. 3.

In some examples, at least one of the expanders 416A-416N in the switch 412 comprises at least one self-test engine as described for FIGS. 1-3 to enable the expander components of the storage access system 400 to perform the self-test engine operations described herein. Further, the initiators 202A-202N and physical storage units of the JBODs 302A-302N may comprise respective self-test engines as described herein to perform the disclosed self-test engine operations.

In accordance with at least some examples, expanders (e.g., expander 212) in the storage access systems 200, 300, and 400 are configured to expand the number of PHY layer interfaces between initiators and physical storage units in compliance with SAS-2. Further, an expander of the storage access systems 200, 300, and 400 are configured to support zoning of the physical storage units.

Figure 5:
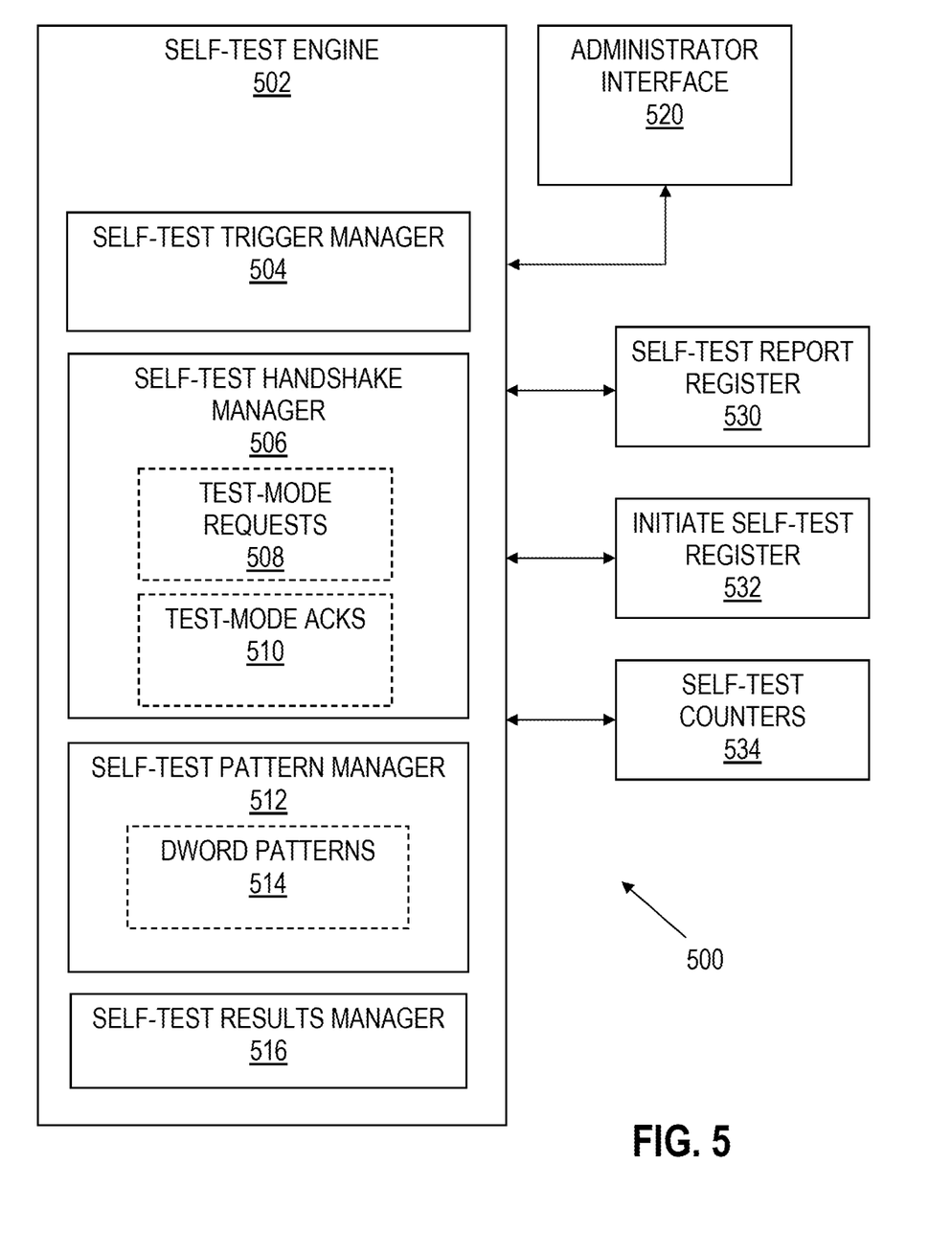
FIG. 5 shows a self-test engine system in accordance with an example of the disclosure.

FIG. 5 shows a self-test engine system 500 in accordance with an example of the disclosure. The self-test engine system 500 comprises a self-test engine 502, which may correspond to any of the self-test engines described herein. As shown, the self-test engine 502 may comprise a self-test trigger manager 504, a self-test handshake manager 506, a self-test pattern manager 512, and a self-test results manager 516. Further, the self-test engine system 500 may comprise an administrator interface 520, a self-test report register 530, an initiate self-test register 532, and self-test counters 534 in communication with the self-test engine 502. The administrator interface 520 may be used, for example, to update self-test operations and/or debug the self-test engine as needed. Although the administrator interface 520, the self-test report register 530, the initiate self-test register 532, and the self-test counters 534 are shown external to the self-test engine 502, any of these components may alternatively be part of the self-test engine 502.

In at least some examples, the self-test trigger manager 504 operates to trigger a self-test mode in response to an asynchronous trigger event, or a scheduled trigger event. An asynchronous trigger event may correspond to a new PHY link event, or a fault detection. Meanwhile, a scheduled trigger event may correspond to a periodic trigger in accordance with a predetermined schedule. Upon receipt of a recognized trigger, the self-test trigger manager 504 may initiate a self-test process. As an example, the self-test trigger manager 504 may cause a transceiver to access the initiate self-test register 532 to initiate a self-test process in response to a trigger.

The self-test handshake manager 506 operates to perform local PHY or remote PHY handshake operations to establish a self-test mode based on test-mode requests 508 and test-mode ACKS 510. For local PHY handshake operations, the self-test handshake manager 506 may cause a transceiver to send a test-mode request primitive and initiate transmission of DWORD patterns in response to a test-mode acknowledge primitive. For remote PHY handshake operations, the self-test handshake manager 506 may cause a transceiver to receive a test-mode request primitive and send a test-mode acknowledge (ACK) primitive.

The self-test pattern manager 512 may provide a test pattern. In some examples, the test pattern may correspond to a DWORD pattern. Without limitation to other examples, JPAT, D10.2, or RANDOM patterns may be employed by the self-test pattern management 512. For local PHY self-test pattern operations, the self-test pattern manager 512 may cause a transceiver to send and receive DWORD patterns to a remote PHY in accordance with a test-mode request. For remote PHY self-test pattern operations, the self-test pattern manager 512 may cause a transceiver to echo back received patterns to the local PHY.

The self-test results manager 516 may manage completion and reporting of self-tests. For remote PHY self-test mode operations, the self-test results manager 516 may cause a transceiver to receive a test-mode complete primitive and send a test-mode success result or test-mode failure result. For local PHY self-test mode operations, the self-test results manager 516 may cause a transceiver to send a test-mode complete primitive and receive a test-mode result. For local PHY self-test mode operations, the self-test results manager 516 may additionally or alternatively cause a transceiver to access the self-test counters 534 to determine if invalid DWORDs were detected during the test-mode. For local PHY self-test mode operations, the self-test results manager 516 may additionally or alternatively cause a transceiver to update self-test report register 530 with the self-test results. The self-test report register 530 may be accessed by firmware or other mechanism to review test results.

Figure 6:
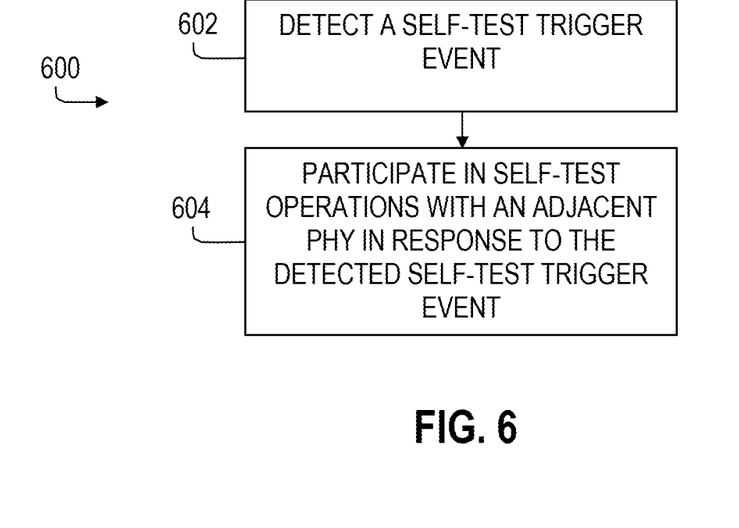
FIG. 6 shows a method in accordance with an example of the disclosure.

FIG. 6 shows a method 600 in accordance with an example of the disclosure. The method 600 may be performed, for example, by a SAS component with a PHY layer (e.g., an initiator, an expander, or a target). As shown, the method 600 comprises detecting a self-test trigger event at block 602. At block 604, the method 600 comprises participating in self-test operations with an adjacent PHY in response to the detected self-test trigger event.

The method 600 may additionally or alternatively comprise other steps. For example, the method 600 may comprise participating in a test-mode handshake with the adjacent PHY. Further, the method 600 may comprise participating in sending and receiving test-mode DWORD patterns with the adjacent PHY. Further, the method 600 may comprise participating in sending or receiving test-mode results with the adjacent PHY. Further, the method 600 may comprise accessing counters to determine test-mode results and updating registers with the test-mode results.

Figure 7:
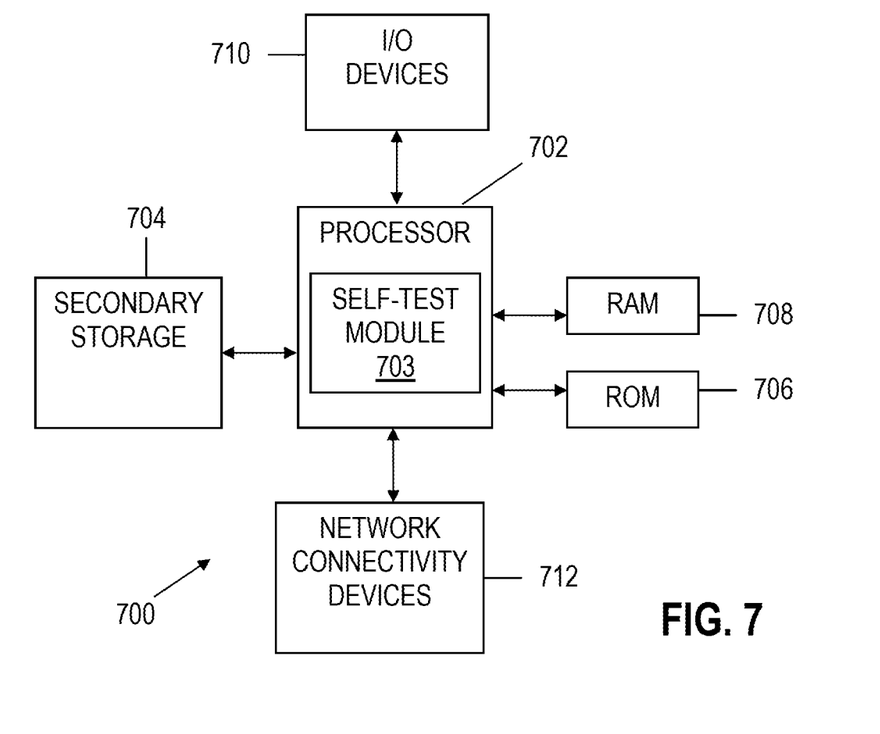
FIG. 7 shows components of a computer system in accordance with an example of the disclosure.

The SAS components and operations to support self-test engine operations as described above may be implemented with any general-purpose computing component, such as an application-specific integrated chip (ASIC), a computer, or a network component with sufficient processing power, memory resources, and network throughput capability to handle the necessary workload placed upon it. FIG. 7 shows components of a computer system 700 in accordance with an example of the disclosure. The computer system 700 may correspond to components of a SAS topology capable of implementing the self-test engine operations described herein.

As shown, the computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

As shown, the processor 702 comprises a self-test module 703, which corresponds to a software implementation of the self-test engine described herein. Alternatively, the self-test module 703 may be stored external to the processor 702 and may be accessed as needed to perform the self-test engine operations described herein. In some examples, the self-test engine 106 of FIG. 1 may include the processor 702 executing the self-test module 703.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. In the electrical engineering and software engineering arts that functionality that can be implemented by loading executable software into a computer can be converted to a hardware implementation by well-known design rules. Decisions between implementing a concept in software versus hardware may hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Thus, a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an example, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

In an example, some or all of the self-test engine functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM example of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

Such a non-transitory computer-readable storage medium may store a self-test management program that performs the operations described herein for the self-test engine 106. The self-test management program may be executed by the processor 702, which may be part of a PHY transceiver or which may be in communication with a PHY transceiver as described herein. For example, the self-test management program, when executed, may cause the processor 702 to detect a self-test trigger event and to participate in self-test operations with an adjacent PHY of a serial-attached SCSI (SAS) topology in response to the detected self-test trigger event. Further, the self-test management program, when executed, may cause the processor 702 to participate in a test-mode handshake with the adjacent PHY. Further, the self-test management program, when executed, may cause the processor 702 to participate in sending and receiving test-mode DWORD patterns with the adjacent PHY. Further, the self-test management program, when executed, may cause the processor 702 to participate in sending or receiving test-mode results with the adjacent PHY. Further, the self-test management program, when executed, may cause the processor 702 to access counters to determine test-mode results and to update registers with the test-mode results.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a transceiver;
   a non-transitory computer-readable medium in communication with the transceiver and storing a self-test engine to manage self-test mode operations between adjacent PHYs of a serial-attached SCSI (SAS) topology, wherein the adjacent PHYs comprise physical links in the SAS topology; and
   a processor to execute the self-test engine, wherein execution of the self-test engine comprises:
      sending a test-mode request to one of the adjacent PHYs;
      receiving a test-mode acknowledge from the one of the adjacent PHYs;
      sending a test pattern to the one of the adjacent PHYs;
      sending a test-mode complete message to the one of the adjacent PHYs; and
      receiving a test-mode result from the one of the adjacent PHYs;
   wherein, upon executing the self-test engine, at periodic intervals and upon detection of a fault condition, the processor causes the self-test mode operations to be initiated by the apparatus and performed between the apparatus and one of the adjacent PHYs, wherein the adjacent PHYs each stores the self-test engine.

2. The apparatus of claim 1, wherein the test pattern comprises transmission of DWORD patterns.

3. The apparatus of claim 1, wherein the self-test mode operations cause the transceiver to send and receive DWORD patterns in accordance with the test-mode request.

4. The apparatus of claim 1, wherein the test-mode result comprises a test-mode success result or a test-mode failure result.

5. The apparatus of claim 1, wherein the self-test mode operations cause the transceiver to access counters to determine if invalid DWORDs were detected during the test-mode.

6. The apparatus of claim 1, wherein the self-test mode operations cause the transceiver to access counters to determine if invalid DWORDs were detected during the self-test mode operations.

7. The apparatus of claim 1, wherein the self-test mode operations cause the transceiver to update registers for use by firmware with the test-mode result.

8. The apparatus of claim 1, wherein the apparatus corresponds to an initiator device, of the SAS topology.

9. A non-transitory computer-readable medium storing a self-test management program that, when executed, causes a transceiver to:
   detect a self-test trigger event; and
   participate in self-test operations with an adjacent PHY of a serial-attached SCSI (SAS) topology in response to the detected self-test trigger event, wherein the adjacent PHY comprises a physical link in the SAS topology and also stores the self-test management program;
   wherein to participate in the self-test operations, the transceiver is caused to:
      receive a test mode request;
      respond to the test mode request with a test mode acknowledgment (ACK);
      receive a test pattern;
      receive a test-mode complete message; and
      send a test-mode result.

10. The non-transitory computer-readable medium of claim 9, wherein the self-test management program, when executed, causes the transceiver to participate in a test-mode handshake with the adjacent PHY.

11. The non-transitory computer-readable medium of claim 9, wherein the test pattern comprises DWORD patterns.

12. The non-transitory computer-readable medium of claim 9, wherein the test-mode result comprises a test-mode success result or a test-mode failure result.

13. The non-transitory computer-readable medium of claim 9, wherein the self-test management program, when executed, causes the transceiver to access counters to determine the test-mode result and to update registers with the test-mode result.

14. A method, comprising:
- detecting a fault condition after deployment of a serial-attached SCSI (SAS) topology;
- as a result of detecting the fault condition, sending, by a self test engine on a local PHY a test mode request to a self test engine on a remote PHY to initiate a self-test, wherein the local PHY and the remote PHY are physical links in the SAS topology;
- receiving, by the local PHY a test mode acknowledgment (ACK) from the remote PHY;
- transmitting, by the local PHY, a series of test word patterns to the remote PHY;
- receiving, by the local PHY, the test word patterns echoed back from to the remote PHY;
- sending, by the local PHY, a test mode complete message to the remote PHY; and
- receiving, by the local PHY, a test-mode result from the remote PHY.

15. The method of claim 14, wherein the test word patterns comprise DWORD patterns.

16. The method of claim 14, further comprising accessing counters to determine the test-mode result and updating registers with the test-mode result.

\* \* \* \* \*

UNITED STATES PATENT AND TRADEMARK OFFICE
CERTIFICATE OF CORRECTION

| | | |
|---|---|---|
| PATENT NO. | : 9,037,910 B2 | Page 1 of 1 |
| APPLICATION NO. | : 13/561989 | |
| DATED | : May 19, 2015 | |
| INVENTOR(S) | : Michael G. Myrah et al. | |

It is certified that error appears in the above-identified patent and that said Letters Patent is hereby corrected as shown below:

In the claims

In column 11, line 19, in Claim 14, delete "from to" and insert -- from --, therefor.

Signed and Sealed this
Eighth Day of December, 2015

Michelle K. Lee
*Director of the United States Patent and Trademark Office*